United States Patent
Garcia Crespo et al.

(10) Patent No.: US 10,549,726 B2
(45) Date of Patent: Feb. 4, 2020

(54) ASSEMBLY FOR CLEANING SENSOR COVER AND METHOD OF USING THE SAME

(71) Applicant: Ford Global Technologies, LLC, Dearborn, MI (US)

(72) Inventors: Jose Garcia Crespo, Bloomfield Township, MI (US); Brad Napier Doman, Ann Arbor, MI (US); Andre Sykula, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 141 days.

(21) Appl. No.: 15/629,866

(22) Filed: Jun. 22, 2017

(65) Prior Publication Data
US 2018/0370500 A1    Dec. 27, 2018

(51) Int. Cl.
| | |
|---|---|
| *B60S 3/04* | (2006.01) |
| *B60S 1/56* | (2006.01) |
| *B60S 1/02* | (2006.01) |
| *B60S 1/52* | (2006.01) |
| *G02B 27/00* | (2006.01) |
| *A47L 5/28* | (2006.01) |
| *B05B 1/10* | (2006.01) |
| *B08B 3/02* | (2006.01) |
| *B60S 1/46* | (2006.01) |
| *G05D 1/02* | (2006.01) |
| *A47L 9/00* | (2006.01) |
| *G05D 1/00* | (2006.01) |

(52) U.S. Cl.
CPC . *B60S 3/04* (2013.01); *A47L 5/28* (2013.01); *B05B 1/10* (2013.01); *B08B 3/02* (2013.01); *B60S 1/02* (2013.01); *B60S 1/46* (2013.01); *B60S 1/524* (2013.01); *B60S 1/56* (2013.01); *G02B 27/0006* (2013.01); *G05D 1/02* (2013.01); *A47L 9/00* (2013.01); *G05D 1/00* (2013.01)

(58) Field of Classification Search
CPC .......... B60S 1/0848; B60S 1/56; B60S 1/566; B60S 1/62; G02B 27/0006; B60R 1/0602
See application file for complete search history.

(56) References Cited

U.S. PATENT DOCUMENTS

| | | | |
|---|---|---|---|
| 6,129,093 A | * | 10/2000 | Kelly .................... B60S 1/0477 134/6 |
| 6,607,606 B2 | | 8/2003 | Bronson |

(Continued)

FOREIGN PATENT DOCUMENTS

| | | |
|---|---|---|
| DE | 102008027430 | 2/2009 |
| DE | 102013006686 | 10/2014 |
| JP | 2005291808 | 10/2005 |

OTHER PUBLICATIONS

Product Brochure. X|Clear. X Stream Designs. Retrieved Jun. 22, 2017 from: http://xstreamdesigns.com/features/self-cleaning/.

*Primary Examiner* — Marc Lorenzi
(74) *Attorney, Agent, or Firm* — Vichit Chea; Carlson, Gaskey & Olds, P.C.

(57) ABSTRACT

An assembly for cleaning a sensor cover according to an exemplary aspect of the present disclosure includes, among other things, a sensor provided within the sensor cover, a wiper configured to wipe the sensor cover, and a vibrating motor configured to vibrate at least one of the wiper and the sensor cover. A method is also disclosed.

12 Claims, 2 Drawing Sheets

(56) References Cited

U.S. PATENT DOCUMENTS

| | | | |
|---|---|---|---|
| 8,567,963 B1* | 10/2013 | Criscuolo | B08B 1/006 |
| | | | 359/507 |
| 9,278,670 B2 | 3/2016 | Hattori et al. | |
| 9,568,807 B2 | 2/2017 | Aldred et al. | |
| 2005/0229351 A1* | 10/2005 | McMullen | B60S 1/546 |
| | | | 15/250.04 |
| 2007/0022558 A1* | 2/2007 | Petkov | B60S 1/0477 |
| | | | 15/250.361 |
| 2012/0243093 A1* | 9/2012 | Tonar | H01L 41/0973 |
| | | | 359/507 |
| 2012/0291216 A1* | 11/2012 | Schauble | B60S 1/3805 |
| | | | 15/250.01 |
| 2013/0180545 A1* | 7/2013 | Nelson | B60S 1/08 |
| | | | 134/6 |
| 2015/0143655 A1* | 5/2015 | Caillot | B60S 1/524 |
| | | | 15/250.04 |
| 2016/0121855 A1 | 5/2016 | Doorley et al. | |
| 2017/0225660 A1* | 8/2017 | Trebouet | B60S 1/52 |

* cited by examiner

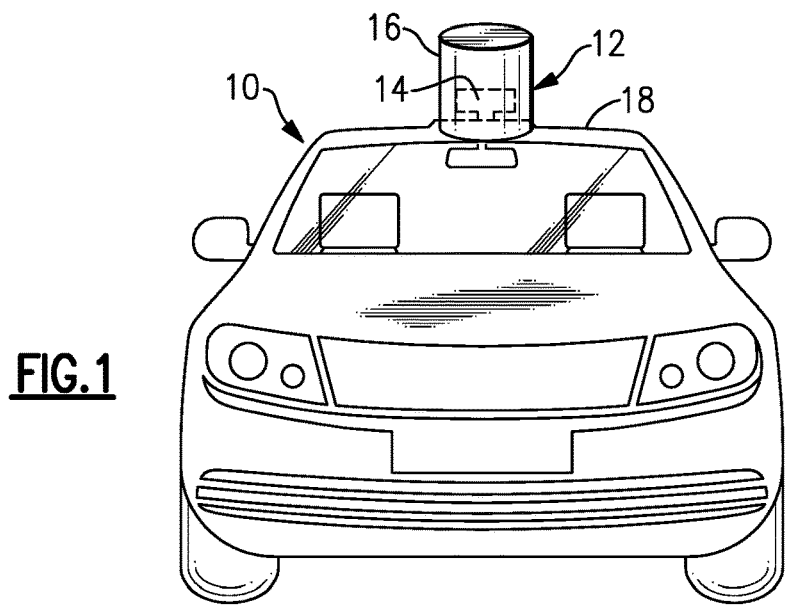
FIG.1
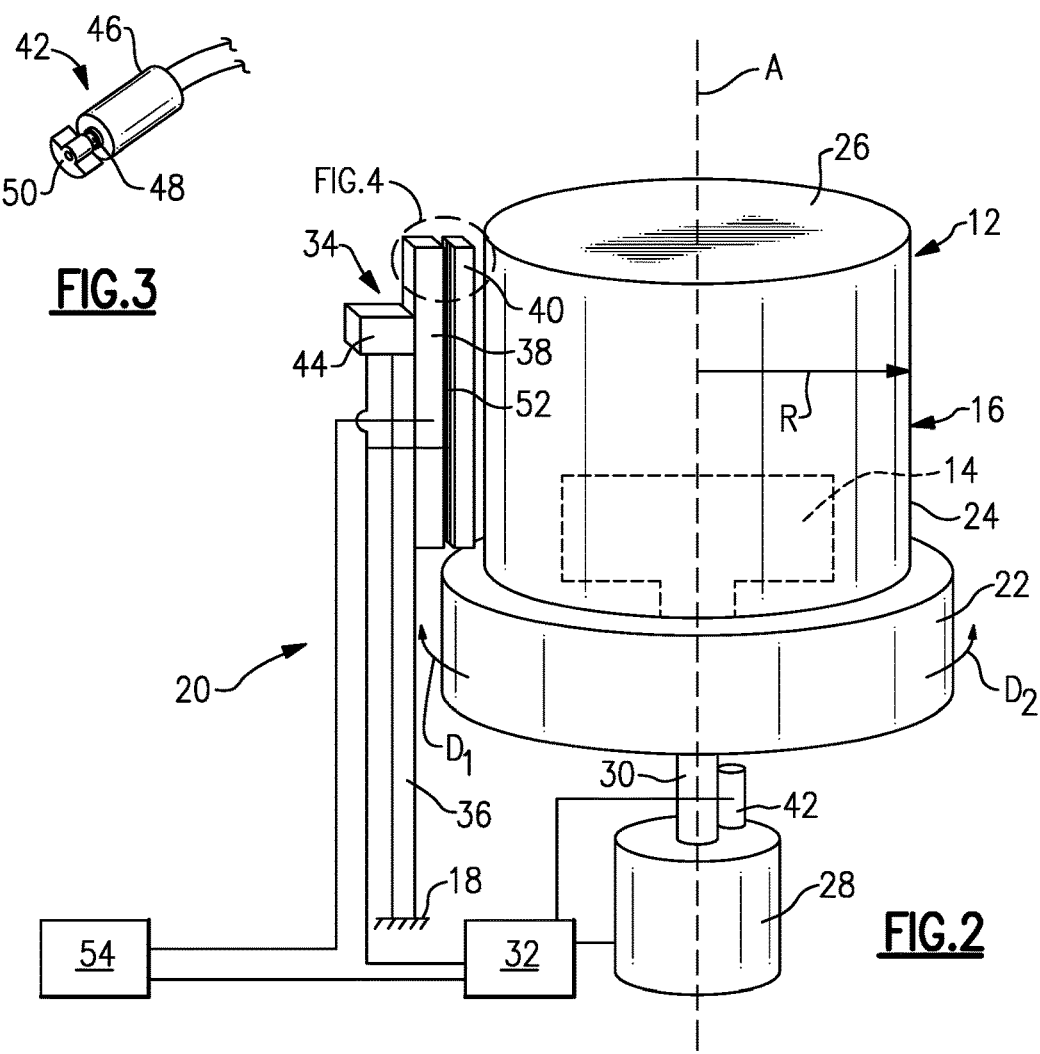
FIG.3
FIG.2

ASSEMBLY FOR CLEANING SENSOR COVER AND METHOD OF USING THE SAME

BACKGROUND

This disclosure relates to an assembly for cleaning a sensor cover and a method of using the same.

Autonomous vehicles may be operated wholly or partly without human intervention, and include one or more sensors that convey information to a central computer in the vehicle. Data from the sensors can provide information concerning environmental conditions, edges of a road or lanes in a road, as examples, and can be used to formulate an appropriate speed for the vehicle, an appropriate path for the vehicle, among other things. The sensors are often mounted to an exterior body of the vehicle. Some sensors include covers to protect the sensors from exposure to environmental conditions.

SUMMARY

An assembly for cleaning a sensor cover according to an exemplary aspect of the present disclosure includes, among other things, a sensor provided within the sensor cover, a wiper configured to wipe the sensor cover, and a vibrating motor configured to vibrate at least one of the wiper and the sensor cover.

In a further non-limiting embodiment of the foregoing assembly, the wiper includes an arm, a wiper head connected to the arm, and a blade connected to the wiper head. Further, the vibrating motor is connected to the wiper head and is configured to vibrate the wiper.

In a further non-limiting embodiment of any of the foregoing assemblies, the arm biases the blade toward the sensor cover.

In a further non-limiting embodiment of any of the foregoing assemblies, the wiper head includes at least one nozzle fluidly coupled to a source of cleaning fluid.

In a further non-limiting embodiment of any of the foregoing assemblies, the wiper head includes a plurality of nozzles spaced-apart from one another along a length of the wiper head.

In a further non-limiting embodiment of any of the foregoing assemblies, the wiper head includes a heating element configured to heat the blade.

In a further non-limiting embodiment of any of the foregoing assemblies, the assembly includes a rotating motor configured to rotate the sensor cover relative to the wiper. The vibrating motor is connected to the rotating motor and is configured to vibrate the sensor cover.

In a further non-limiting embodiment of any of the foregoing assemblies, the wiper is fixed relative to a body of an autonomous vehicle.

In a further non-limiting embodiment of any of the foregoing assemblies, the vibrating motor is a first vibrating motor, and the assembly further includes a second vibrating motor. The first vibrating motor is configured to vibrate the wiper and the second vibrating motor is configured to vibrate the sensor cover.

In a further non-limiting embodiment of any of the foregoing assemblies, the vibrating motor includes an eccentric mass.

In a further non-limiting embodiment of any of the foregoing assemblies, the vibrating motor is activated by a controller in response to a detected low temperature condition.

In a further non-limiting embodiment of any of the foregoing assemblies, the sensor is a light detection and ranging (LIDAR) sensor of an autonomous vehicle.

In a further non-limiting embodiment of any of the foregoing assemblies, the sensor cover is transparent.

A method according to an exemplary aspect of the present disclosure includes, among other things, rotating a sensor cover relative to a wiper, the sensor cover covering a sensor, and vibrating at least one of the sensor cover and the wiper.

In a further non-limiting embodiment of the foregoing method, the wiper includes an arm, a wiper head connected to the arm, and a blade connected to the wiper head. Further, the vibrating step is performed by a vibrating motor connected to the wiper head.

In a further non-limiting embodiment of any of the foregoing methods, the method includes spraying cleaning fluid out of at least one nozzle in the wiper head.

In a further non-limiting embodiment of any of the foregoing methods, the method includes heating the wiper using a heating element in the wiper head.

In a further non-limiting embodiment of any of the foregoing methods, vibrating step is performed by a vibrating motor connected to a rotating motor, the rotating motor configured to rotate the sensor cover.

In a further non-limiting embodiment of any of the foregoing methods, the vibrating step includes vibrating the wiper with a first vibrating motor and vibrating the sensor cover with a second vibrating motor.

In a further non-limiting embodiment of any of the foregoing methods, the sensor is a light detection and ranging (LIDAR) sensor of an autonomous vehicle.

BRIEF DESCRIPTION OF THE DRAWINGS

FIG. 1 is a front view of an example motor vehicle including a sensor assembly.

FIG. 2 illustrates an assembly for cleaning the sensor assembly of FIG. 1.

FIG. 3 illustrates an example vibrating motor.

DETAILED DESCRIPTION

Figure 4:
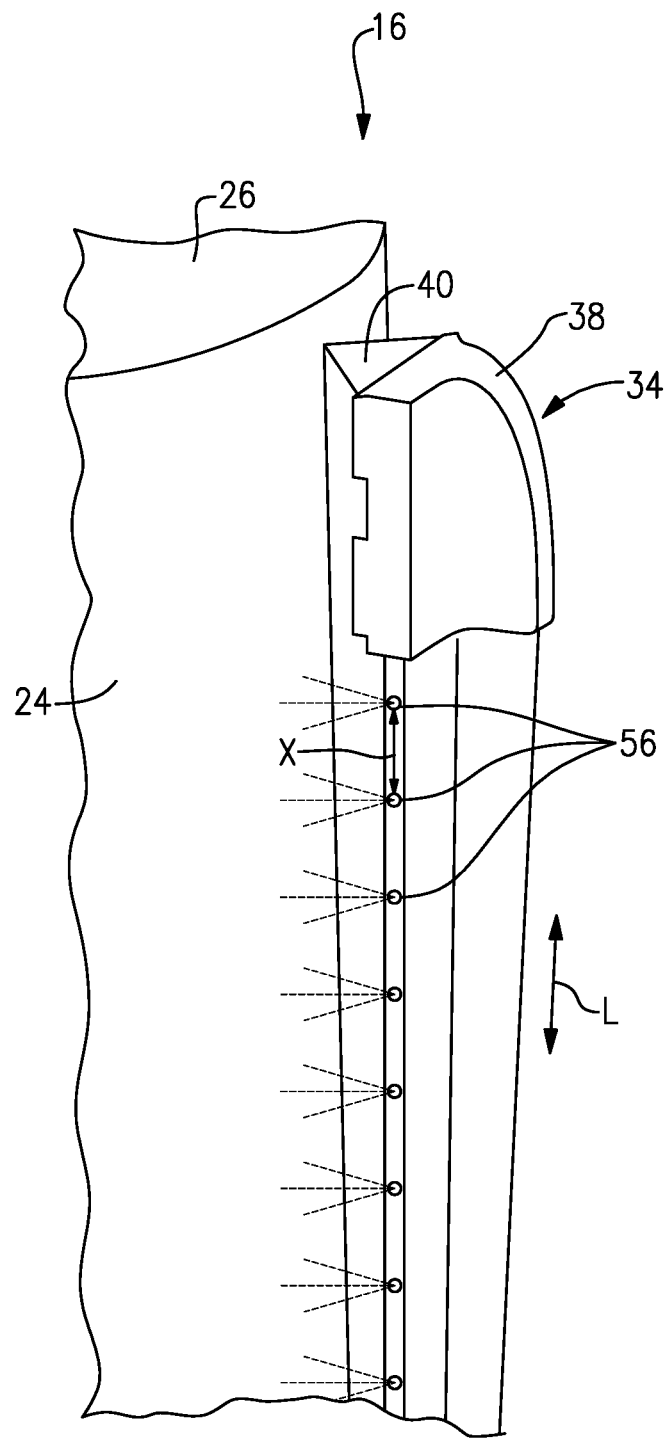
FIG. 4 illustrates a wiper in more detail, including an example nozzle arrangement.

This disclosure relates to an assembly for cleaning a sensor cover and a method of using the same. In one example, a sensor is provided within a sensor cover, and a wiper is configured to wipe the sensor cover. Further, a vibrating motor is configured to vibrate at least one of the wiper and the sensor cover. Such vibration eases removal of rain, snow, ice, and debris, as examples, from the sensor cover. In turn, the vibration allows the assembly to readily clean the sensor cover, which increases sensor accuracy.

FIG. 1 is a front view of a motor vehicle 10, which is shown as a sedan. The vehicle 10 could be any other type of vehicle, including an SUV, minivan, or truck, to name a few examples. The vehicle 10 is an autonomous vehicle in this example, and includes at least one sensor assembly 12. The vehicle 10 is operated wholly or partly without human intervention, and uses information from the sensor assembly 12 to make decisions regarding vehicle speed, vehicle path, etc.

The sensor assembly 12 in this example includes a sensor 14 and a sensor cover 16. The sensor 14 is a light detection and ranging (LIDAR) sensor, although this disclosure extends to other types of sensors. The sensor 14 is provided within the sensor cover 16. The sensor cover 16 is provided by a transparent material, such as plastic, glass, or a composite material, and protects the sensor 14 from exposure to environmental conditions.

The sensor assembly 12 is provided on an exterior body of the vehicle 10. In this example, the sensor assembly 12 is provided on a roof 18 of the vehicle 10. The sensor assembly 12 could be provided at another location on the vehicle 10. Further, the vehicle 10 may include additional sensor assemblies on the exterior body of the vehicle. Those sensor assemblies may benefit from the cleaning assembly and method described in this disclosure.

FIG. 2 illustrates an assembly 20 for cleaning the sensor assembly 12, and more particularly for cleaning the sensor cover 16. One would understand some aspects of the assembly 20 are shown somewhat schematically, while other aspects of the assembly 20 are exaggerated for purposes of illustration only.

In this example, the sensor cover 16 is substantially cylindrical and is arranged about an axis A. The sensor cover 16 is coupled to a cover holder 22, and includes an exterior surface 24 defined at a constant radius R from the axis A. The sensor cover 16 further includes a cap surface 26 at a top portion thereof. While the cap surface 26 is shown as a flat surface in FIG. 2, the cap surface 26 could be rounded.

The entirety of the sensor cover 16 may be provided by a transparent material. Alternatively, the exterior surface 24 may be provided by a transparent material, and the cap surface 26 may be opaque. The sensor 14 is arranged within the sensor cover 16, and pulses a light through the sensor cover 16 and measures reflected pulses. The assembly 20 keeps the exterior surface 24 of the sensor cover 16 clean, which increases accuracy of the sensor 14.

In this example, the cover holder 22 is coupled to a rotating motor 28 by way of a shaft 30. The sensor cover 16, the cover holder 22, and the shaft 30 are rotatable in directions $D_1$, $D_2$ about the axis A by way of the rotating motor 28. The rotating motor 28 is operable in response to instructions from a controller 32. The rotating motor 28 may be configured to rotating the sensor cover 16 completely around the axis A throughout a 360° range of motion. Alternatively, the motor 28 may rotate the sensor cover back and forth in the directions $D_1$, $D_2$ throughout a lesser range of motion.

The controller 32 is shown schematically in FIG. 1. It should be understood that the controller 32 could be part of an overall vehicle control module, such as a vehicle system controller (VSC), or could alternatively be a stand-alone controller separate from the VSC. Further, the controller 32 may be programmed with executable instructions for interfacing with and operating the various components of the vehicle 10. The controller 32 additionally includes a processing unit and non-transitory memory for executing the various control strategies and modes of the vehicle system.

The rotating motor 28 rotates the sensor cover 16 relative to a wiper 34 configured to wipe the sensor cover 16. The wiper 34 is fixedly mounted to exterior of the vehicle 10, and in this example is fixedly mounted to the roof 18. The wiper 34 includes an arm 36 connected to the roof 18, a wiper head 38 connected to the arm 36, and a blade 40 connected to the wiper head 38. In this example, the arm 36 is made of metal and is arranged to bias the blade 40, which is made of rubber, in a direction toward exterior surface 24 the sensor cover 16. Thus, the blade 40 directly contacts the exterior surface 24 as the sensor cover 16 rotates about the axis A. The blade 40 wipes the exterior surface 24 and, in doing so, removes rain, snow, ice, and debris, as examples, from the sensor cover 16.

In order to increase the ease of cleaning the sensor cover 16, the cleaning assembly 20 includes a number of accessories. In one example, the cleaning assembly 20 includes a vibrating motor configured to vibrate at least one of the sensor cover 16 and the wiper 34. In the example of FIG. 2, there are two vibrating motors 42, 44 mounted to the rotating motor 28 and the wiper head 38. It should be understood that this disclosure extends to embodiments including only the vibrating motor 42, only the vibrating motor 44, or both of the vibrating motors 42, 44.

The vibrating motors 42, 44 are responsive to instructions from the controller 32. The vibrating motors 42, 44 cause the sensor cover 16 and the wiper 34, respectively, to vibrate, which increases the ease of removal of certain types of buildup on the sensor cover 16, such as snow, ice, and mud, as examples.

In one example, the controller 32 instructs the vibrating motors 42, 44 to vibrate when the vehicle is in a low temperature condition. For example, the controller 32 may instruct the vibrating motors 42, 44 to vibrate in a condition where ice or snow may be present, such as when an outside temperature is below 32° F. (0° C.). Alternatively or additionally, the controller 32 may instruct the vibrating motors 42, 44 to vibrate when the controller 32 detects increased resistance from the rotating motor 28, which may be caused due to buildup of ice or snow adjacent the sensor cover 16.

FIG. 3 illustrates the vibrating motor 42 in more detail. It should be understood that the vibrating motor 44 is arranged similarly. The vibrating motor 42 includes a motor 46 which rotates a shaft 48. The vibrating motor 42 further includes an eccentric mass counter weight 50 mounted to the shaft 48. As the shaft 48 rotates, the eccentric mass counter weight 50 causes vibration. While one type of vibrating motor is shown in FIG. 3, it should be understood that other types of vibrating motors come within the scope of this disclosure.

Referring back to FIG. 2, the assembly 20 may include additional accessories configured to increase the ease of cleaning the sensor cover 16. In the example of FIG. 2, the wiper head 38 includes a heating element 52, which converts electricity into heat. The heating element 52 is activated in response to instructions from the controller 32. The heating element 52 may be a ceramic-based or polymer-based heating element. The heating element 52 increases the temperature of the wiper 34, and specifically the blade 40, which increases the ease of removing ice and snow from the sensor cover 16.

In the embodiment of FIG. 2, the wiper 34 is also configured to spray cleaning fluid on the sensor cover 16. In particular, the wiper head 38 includes at least one nozzle fluidly coupled to a source of cleaning fluid 54. The cleaning fluid 54 may be windshield washer fluid. Spraying cleaning fluid 54 on the sensor cover 16 increases the ease of cleaning the sensor cover 16. The cleaning fluid 54 may also increase the ease of breaking up and removing snow and ice from the sensor cover 16.

FIG. 4 illustrates one particular example in which the wiper head 38 includes a plurality of nozzles 56 spaced-apart from one another along a length L of the wiper head. The nozzles 56 are spaced-apart from one another by a distance X in this example. The distance X may be about 10 mm (about 0.4 inches) and the wiper head 38 may include between eight (8) and nine (9) nozzles 56 in one example. Providing a plurality of spaced-apart nozzles 56 provides the cleaning fluid 54 precisely where it is needed, and saves up to 60% of the cleaning fluid relative to some prior spraying techniques.

While the assembly 20 includes various independent accessories, it should be understood that this disclosure extends to assemblies that use these accessories independently and together. In one particular example, there are compounding benefits when using the vibrating motors 42, 44, the heating element 52, and the nozzles 56 in combination to remove ice or snow from the sensor cover 16, for example. However, it should also be appreciated that each of the vibrating motors, heating element, and nozzles independently increases the ease of cleaning the sensor cover 16.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly for cleaning a sensor cover, wherein a sensor is provided in the sensor cover, the assembly comprising:
   a wiper configured to wipe the sensor cover;
   a rotating motor configured to rotate the sensor cover relative to the wiper; and
   a vibrating motor directly connected to the rotating motor and configured to vibrate the sensor cover;
   wherein the wiper includes an arm, a wiper head connected to the arm, and a blade connected to the wiper head, and
   wherein the wiper head includes a plurality of nozzles spaced-apart from one another along a length of the wiper head, and the plurality of nozzles are fluidly coupled to a source of liquid cleaning fluid.

2. The assembly as recited in claim 1, wherein the arm biases the blade toward the sensor cover.

3. The assembly as recited in claim 1, wherein the wiper head includes a heating element configured to heat the blade.

4. The assembly as recited in claim 1, wherein the wiper is fixed relative to a body of an autonomous vehicle.

5. The assembly as recited in claim 1, wherein the vibrating motor is a first vibrating motor, and wherein the assembly further includes a second vibrating motor configured to vibrate the wiper.

6. The assembly as recited in claim 1, wherein the vibrating motor includes an eccentric mass.

7. The assembly as recited in claim 6, wherein the vibrating motor is activated by a controller in response to a detected low temperature condition.

8. The assembly as recited in claim 1, wherein the sensor is a light detection and ranging (LIDAR) sensor of an autonomous vehicle.

9. The assembly as recited in claim 8, wherein the sensor cover is transparent.

10. The assembly as recited in claim 1, wherein the plurality of nozzles are spaced-apart from one another by a distance of 10 mm.

11. The assembly as recited in claim 10, wherein the wiper head includes a total of eight or nine nozzles.

12. The assembly as recited in claim 1, wherein the liquid cleaning fluid is windshield washer fluid.

* * * * *